United States Patent [19]

Masubuchi

[11] Patent Number: 4,464,578

[45] Date of Patent: Aug. 7, 1984

[54] WAVE ENERGY CONVERTER

[75] Inventor: Masami Masubuchi, Ibaragi, Japan

[73] Assignee: Osaka University, Osaka, Japan

[21] Appl. No.: 251,738

[22] Filed: Apr. 7, 1981

[30] Foreign Application Priority Data

Apr. 14, 1980 [JP] Japan .................................. 55-48906

[51] Int. Cl.³ ............................................. F03B 13/12
[52] U.S. Cl. ...................................... 290/42; 290/53; 60/501; 60/506; 417/332
[58] Field of Search ...................... 290/42, 53; 60/497, 60/500–502, 505–507; 417/100, 330–333

[56] References Cited

U.S. PATENT DOCUMENTS 4,098,084 7/1978 Cockerell .............................. 60/501

Primary Examiner—G. Z. Rubinson
Assistant Examiner—Shelley Wade

Attorney, Agent, or Firm—Spencer & Frank

[57] ABSTRACT

A wave energy converter comprising a float group including at least two floats connected by elongated rigid links disposed at a right angle to the direction of incidence of waves, which floats are free from the coastal ground and sea bed and allowed to heave, to sway, and to roll. A dynamic system of the converter absorbs the wave energy through the relative movements between the floats and the links and between the adjacent links while the natural frequency of this system is approximately tuned to the frequency of the incident wave. In this way, the reflected waves and transmitted waves caused by this system are suppressed substantially since the energy of the incident wave is virtually absorbed. The wave energy converter may be provided with some air chambers and air turbines or one-directional rotating means actuated by this dynamic system so as to drive electric generators coupled thereto.

8 Claims, 13 Drawing Figures

WAVE ENERGY CONVERTER

BACKGROUND OF THE INVENTION

1. Field of the Invention

This invention relates to a wave energy converter suitable for absorbing ocean wave energy. More specifically, the invention relates to a wave energy converter having a group of at least two floats connected by elongated rigid links disposed at a right angle to the direction of incidence of the waves, which floats are free from the coastal ground and sea bed and are allowed to heave, to sway, and to roll, so that a dynamic system is formed to absorb energy from relative movements between the floats and the links and between the adjacent links, while the natural frequency of this system is approximately tuned to the frequency of the incident wave, whereby the energy absorbing efficiency is remarkably increased and the frequency band having a high energy absorbing efficiency is widened.

2. Description of the Prior Art

Ocean energy is one of the most important natural energy sources and is available in various forms such as tide, ocean currents, streams in the ocean, temperature differences, and waves. Among the different forms of ocean energy, wave energy exists abundantly, but its exploitation for practical use has been limited to only a few examples such as buoy-type electric generating units of several ten watts to energize the lamps of nautical markers. However, research on the exploitation of wave energy has been very active during the past years; for instance, Salter ducks invented by Stephen Salter of University of Edinburgh in Scotland, Cockerell's rafts, air-buoy devices of Britain's National Engineering Laboratory, and a large power-generating ship "KAIMEI" of the Japanese Marine Science and Technology Center of Science and Technology Agency. Recently, M. Bessho of the Japanese Defence Academy proposed a special structural system including a float (Bessho system) and experiments on the Bessho system have been undertaken at Mie Dockyard of Nippon Kokan Kabushiki Kaisha.

Most systems of the prior art to extract ocean wave energy use floats which heave and roll in response to the motion of the incident wave, so that the systems extract wave energy by using the movement of the floats relative to fixed ends thereof secured to coastal ground or the sea bed.

The Bessho system of the prior art uses one float which is secured to the coast or sea bed through a dynamic system including a mass mechanism, a restoring mechanism, and a damping mechanism, so that the energy carried by the wave is transmitted to the dynamic system through the float so as to produce specific phase differences between the float movement and the wave, which phase differences facilitate energy extraction and wave suppression. The physical constants of various elements of the dynamic system are such that the reflected waves and the transmitted waves caused by the float are reduced substantially to zero. Thus, the Bessho system is useful for both wave energy extraction and wave suppression.

The Bessho system is characterized by the following points;

(a) A float floating on the sea is secured to the coastal ground or sea bed through a dynamic system including a restoring mechanism, damping mechanism, and a mass mechanism.

(b) Ocean waves cause the float to heave, to sway and to roll, and if various physical constants of the dynamic system are properly selected, the natural frequency of the fluid-float system can be tuned to that of the incident wave.

(c) When the aforesaid tuning is established, the reflected waves and the transmitted waves produced by the float are minimized substantially to zero, so that the entire energy carried by the incident wave can be extracted.

Theoretically, the Bessho system is advantageous in that when the natural frequency of the fluid-float system is tuned to the major frequency of the incident wave, the entire energy carried by the incident wave can be extracted from the motions such as heaving, swaying, and rolling of the float relative to the fixed point to which the float is secured through the aforesaid dynamic system (including the damping mechanism, the restoring mechanism, and the mass mechanism), and that the reflected waves and the transmitted waves from the float can be suppressed substantially to zero. However, in practice, the Bessho system has the following shortcomings: namely, (i) Since the fluid-float system has only one natural frequency, the energy absorbing efficiency can be maximized as long as the one natural frequency of the fluid-float system is tuned to the major frequency of the incident wave, but when the nature of the incident wave is changed due to variations of the meteorological conditions or other causes, the major frequency of the incident wave fluctuates and the energy absorbing efficiency is reduced greatly. This is due to the fact that the energy absorbing efficiency curve of the Bessho system has a comparatively sharp peak at the tuned frequency of the incident wave. Accordingly, it is apparent that the Bessho system necessitates preparation of a plurality of float systems with different natural frequencies so as to facilitate interchange of the float systems when the meterological conditions are changed.

(ii) The wave energy is absorbed by a dynamic system disposed between the float and a fixed end thereof at the coastal ground or the sea bed, and the float tends to be forced to move excessively away from the fixed end thereof when being exposed to excessively high tide, extraordinarily high waves, and typhoons. Thus, the dynamic system may destroy itself when extraordinary forces act thereon, and it is hard to protect the dynamic system against foreseeable severe conditions at reasonable cost. Full protection of the dynamic system results in an unduly high construction cost.

SUMMARY OF THE INVENTION

Therefore, an object of the present invention is to obviate the aforesaid shortcomings of the prior art, by providing an improved wave energy converter.

To fulfil the object, the wave energy converter according to the present invention does not use any floats which are fixed to or restricted by the coastal ground or sea bed. In the wave energy converter of the invention, a float group is formed by connecting at least two floats afloat the sea surface by one or more elongated rigid links disposed substantially at a right angle to the direction of incidence of the waves while allowing the floats to sway, to heave, and to roll under the constraints of the links. This wave energy converter is formed so as to extract the wave energy through the dynamic systems between the floats and the links and between the adjacent links, and the natural frequency of the float group is approximately tuned to the frequency of the incident wave. In this way, practically the entire energy of the incident wave is extracted, and the reflected waves and the transmitted waves caused by the floats are minimized substantially to zero.

In one embodiment of the invention to convert mechanical energy thus obtained to electrical energy, air chambers and an air turbine are coupled to the float-link system so as to be driven by the mechanical energy extracted from the wave, and an electric generator is driven by the air turbine thus rotated.

In another embodiment of the invention, a one-direction rotating device is coupled to the float-link system so as to be rotated by the mechanical energy extracted from the wave, and an electric generator is driven by the one-direction rotating device thus rotated.

BRIEF DESCRIPTION OF THE DRAWINGS

For a better understanding of the invention, reference is made to the accompanying drawings, in which:

FIGS. 3A, 3B, 3C(A) and 3C(B) depict one example of a dynamic system to convert mechanical energy extracted from the wave to electrical energy. FIGS. 3C(A) and 3C(B) show how the system of FIG. 3A is driven by the relative motion between float and link or between links, and also shows an air flow diagram, in which an electric generator is driven by an air turbine;

Throughout different views of the drawing, 1 is a float, 2 is a link, 3 is a restoring means, 4 is a damping means, 5 is an air chamber, 6 is a rotary blade, 7, 8 are intake ports, 7A through 7D are intake valves, 8A through 8D are discharge valves, 9, 10 are discharge passages, 11 is an air turbine, 12 is an electric generator, 13 is an air accumulator, 14 is a flow rate control valve, and 15 is a relief valve.

DESCRIPTION OF THE PRINCIPLE OF THIS INVENTION

Figure 1:
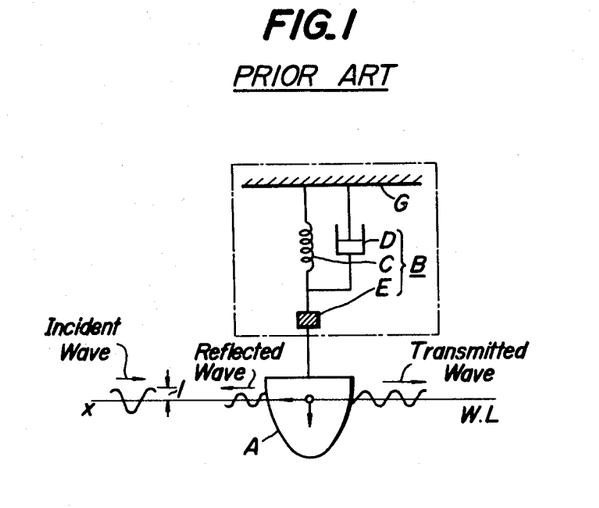
FIG. 1 is a schematic diagram showing a wave energy absorber of the prior art.

Before describing the details of the invention, the construction of a wave energy converter of the prior art will be briefly reviewed, by referring to FIG. 1. One end of a float A disposed on the sea is connected to a fixed point G, such as the coastal ground or sea bed, through a dynamic system B. The dynamic system B comprises a mass means E having one end thereof connected to the float A, a restoring means C disposed between the opposite end of the mass means E and the fixed portion G, and a damping means D connected in parallel with the restoring means C. This construction of the prior art has shortcomings in the susceptibleness to excessive displacements at high seas or the like and in the narrowness of the tuning of the natural frequency thereof to that of the incident waves. The present invention obviates such shortcomings of the prior art.

Figure 2A:
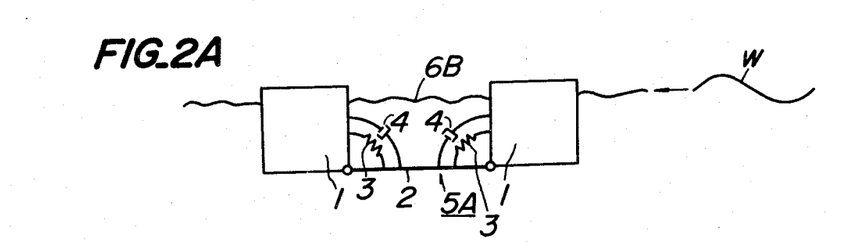
FIGS. 2A, 2B, and 2C are schematic diagrams illustrating the operating principles of the wave energy converter of the invention.

FIG. 2A shows a model of the present invention using two floats. Two floats 1, 1 are pivotally connected to a link 2 and restoring means 3 and damping means 4 are provided between the link 2 and each float 1 as shown in the figure. Each combination of the float 1 and the link 2 through the restoring means 3 and the damping means 4 forms a dynamic system 5A. Incident wave W propagates on the sea surface 6B, in the direction of the arrow of the figure.

Figure 2B:
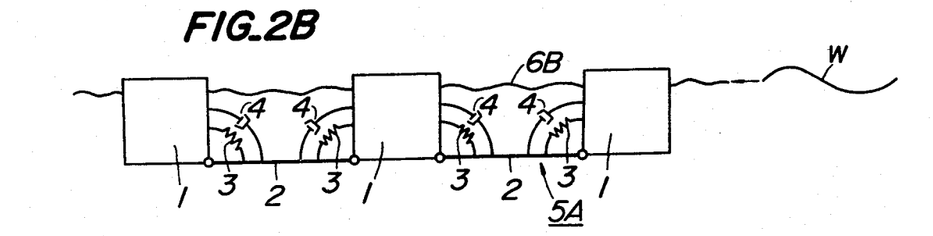

FIG. 2B shows another model of the invention, which uses three floats connected in a linear fashion by two links 2. Each of the joints between the float 1 and the link 2 is provided with a restoring means 3 and a damping means 4, so as to form a dynamic system 5A there.

Figure 2C:
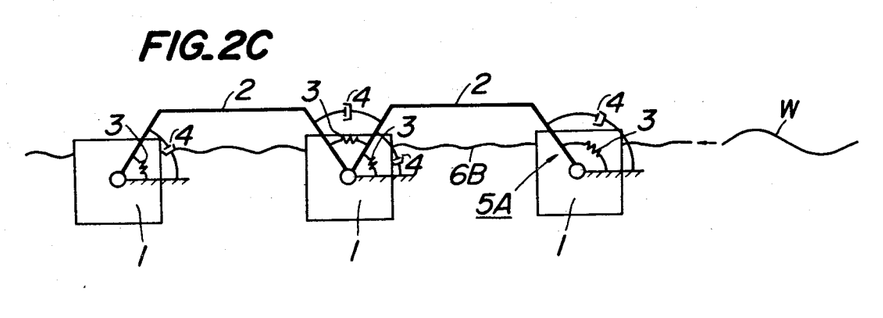

In another more practical model of the invention, as shown in FIG. 2C, two links 2 connects three identical floats 1 disposed in a linear fashion. Each of the links 2 of this embodiment is pivotally connected to that portion of the float 1 which is close to the center of rotation thereof. The shape of the link 2 of FIG. 2C is such that at least a part of the link 2 stays above the sea surface 6B. Each float 1 is coupled to the link 2 through the combination of a restoring means 3 and a damping means 4 as in the preceding models, and the shaded portions of FIG. 2C show that the restoring means 3 and the damping means 4 have one ends thereof connected to fixed points of the float 1. Besides, the adjacent links 2 of this model are coupled by the combination of a restoring means 3 and a damping means 4.

The operation of the wave energy converter of the invention will now be explained. Referring to FIGS. 2A, 2B, and 2C, the floats 1 in the wave energy converter of the invention are not connected to any fixed points, so that in response to the incident wave W, each float freely heaves, sways, and rolls under the constraints of the links. Such motions of the individual floats 1 cause relative movements between the floats 1 and the links 2 and between the adjacent links 2. Such relative movements are of the reciprocating type, but can be converted into rotary motion by a suitable means as will be described hereinafter, so as to facilitate extraction of the wave energy through the dynamic system having the restoring means 3 and the damping means 4.

The reciprocating movements between the floats 1 and the link 2 and between the adjacent links 2 can be converted into rotary motions, for instance by a crank means or a clutch means. The thus produced rotary motions can drive an electric generator to produce electric power from the wave energy.

Figure 3A:
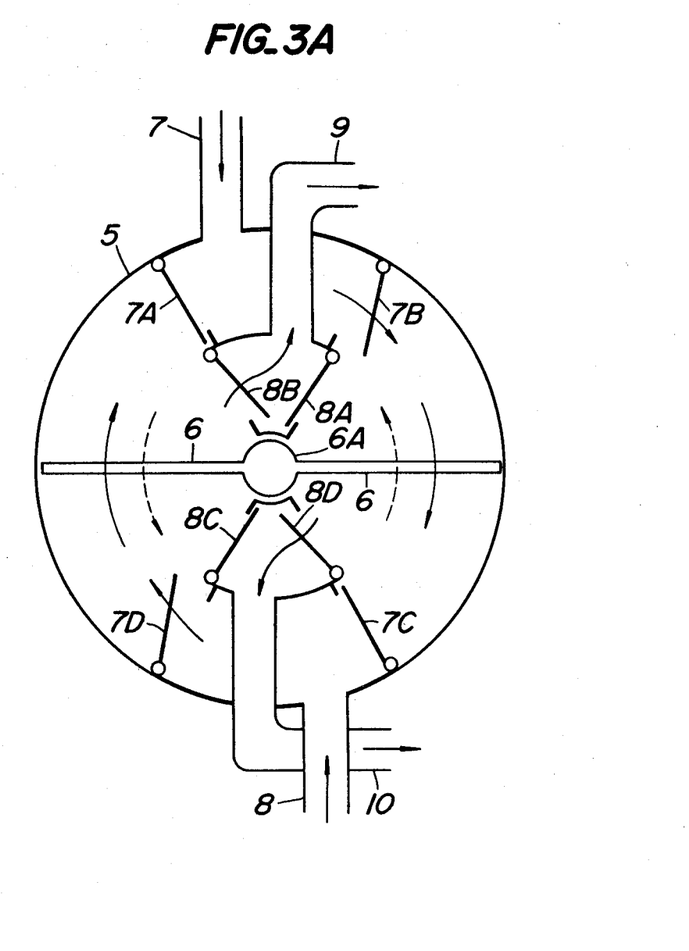
FIGS. 3A and 3B are, respectively, a sectional view and a side view of the mechanical-pneumatic converter which converts mechanical motion to air flow.
Figure 3B:
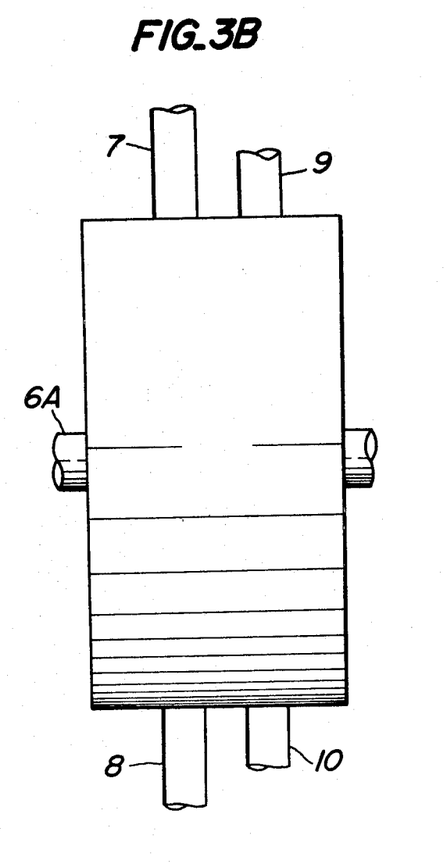
Figure 3C:
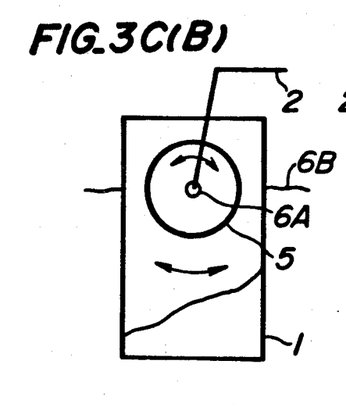

FIGS. 3A, 3B, 3C(A) and 3C(B) illustrate one example of a mechanism to convert the aforesaid relative movements due to the wave energy into a one-way air flow to drive an air turbine 11, the rotation of the air turbine being transmitted to an electric generator 12 for producing electric energy. In FIGS. 3A and 3B, an air chamber 5 is fixed to either the float 1 or the link 2, and a shaft 6A extends along the longitudinal axial center line of the air chamber 5. Two reciprocating blades 6 are secured to the shaft 6A so as to divide the inside space of the air chamber 5 into two sections or portions. Each of the thus divided two air chamber portions is connected to two intake ports 7 and 8 through intake valves 7A, 7B, 7C and 7D and is connected to two discharge passages 9 and 10 through discharge valves 8A, 8B, 8C, and 8D, as shown in FIG. 3A. The two intake ports 7 and 8 are disposed substantially at diametrically opposite positions of the air chamber 5 relative to the shaft 6A, and the discharge passages 9 and 10 are similarly disposed at diametrically opposite positions of the air chamber 5. When the rotary blades 6, 6 secured to the shaft 6A turn in the directions of the solid line arrows of FIG. 3A in the air chamber 5 fastened to the float or the link, the intake valves 7A and 7C are closed, while the remaining intake valves 7B and 7D are opened so as to introduce air into the two portions of the air chamber 5. Under this condition, the discharge valves 8A and 8C are closed, while the remaining discharge valves 8B and 8D are opened so as to discharge the air from the two sections of the air chamber 5 to the discharge passages 9 and 10. On the other hand, when the two rotary blades 6, 6 turn in the opposite direction as shown by the dashed line arrows of FIG. 3A, the intake valves 7A and 7C are opened while the remaining intake valves 7B and 7D are closed, and the discharge valves 8A and 8C are opened while the remaining discharge valves 8B and 8D are closed, so that the air from the intake ports 7 and 8 is compressed by the blades 6, 6 and directed to the discharge passages 9 and 10 through the air chamber 5.

The compressed air from the discharge passages 9 and 10 is directed to an air turbine 11, as shown in FIGS. 3C(A) and 3C(B). Whereby, the air turbine 11 rotates, so as to drive an electric generator 12 coupled thereto. Consequently, the wave energy is converted into electric energy by using the compressed air as a medium of conversion. The air accumulator 13 is used to reduce pulsation in the air flow from the air chamber 5. More particularly, the air accumulator 13 receives the compressed air from the discharge passages 9 and 10 of the air chamber 5, and the compressed air is delivered from the air accumulator 13 to the air turbine 11 through flow rate control valves 14. To protect the air accumulator 13, a relief valve 15 is provided thereon. Whereby, the compressed air is applied to the air turbine 11 at a constant flow rate, so as to run the electric generator 12 substantially at a uniform efficiency.

Figure 4A:
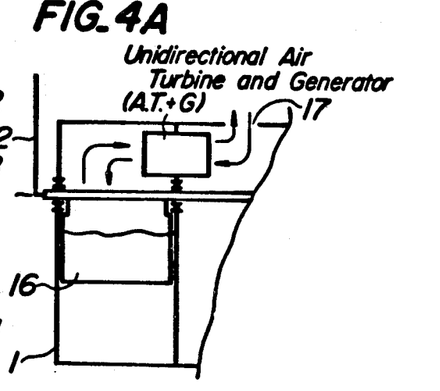
FIGS. 4A and 4B depict is another example of a dynamic system to convert mechanical energy to electrical energy.
Figure 4B:
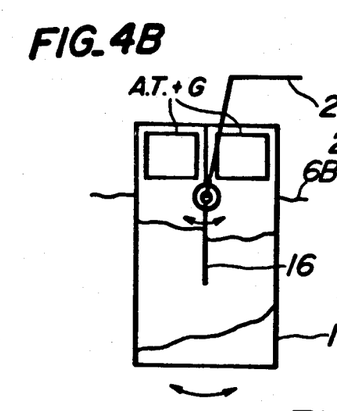

FIGS. 4A and 4B illustrate another example of a mechanism to convert the aforesaid relative movement due to the wave energy into air flow to drive a unidirectional air turbine which is installed in the air passage. The rotation of the air turbine is transmitted to an electric generator for producing electric energy. The float in FIGS. 4A and 4B has no bottom plate and has two air chambers separated by the moving blade 16 fastened to the connecting link 2. By the relative motion between the float 1 and blade 16 due to the wave energy, the air is breathed in the air chamber formed on the water surface within the float and is breathed out from that chamber through the same passage to the intake 17.

The unidirectional air turbine installed in the air passage is driven by the two-directional air flow and the rotation is transmitted to the electric generator, whereby the wave energy is converted into electric energy.

Figure 5:
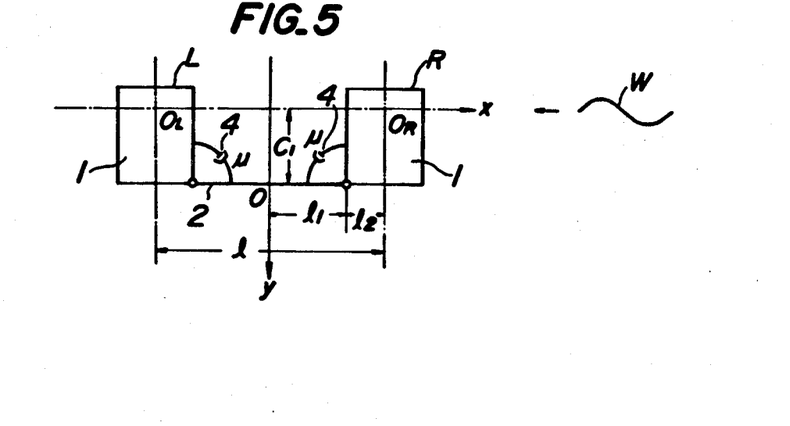
FIG. 5 is a schematic diagram illustrating the derivation of mathematical formulae representing the operation of the wave energy converter of the invention.

The principles of the invention to effectively extract wave energy through the movement of the floats 1 will be now explained in detail. For simplicity, the 2-float system of FIG. 5 including the floats L and R and a link 2 will be described first. In FIG. 5, it is assumed that a unit amplitude sinusoidal wave train of frequency W is incident from $x = \infty$ upon the float. This incident wave causes a forced oscillation in the system of the floats L, R and the link 2.

In general, when the incident wave acts upon the float, the float sways, heaves, and rolls. Consequently, the float produces two kinds of waves on the surrounding water surfaces; namely, a scattered wave and a radiated wave.

(i) Scattered wave: the wave caused due to the presence of the fixed float in the passage of the incident wave.

(ii) Radiated wave: the wave generated in response to sinusoidal movement of one of the float.

In the following, the motions are considered to be two dimensional and the float has the same configuration.

The swaying x(t), the heaving y(t), and the rolling $\theta(t)$ of the float can be expressed as follows.

$$x(t) = Re(X_1 e^{i\omega t})$$

$$y(t) = Re(X_2 e^{i\omega t})$$

$$\theta(t) = Re(X_3 e^{i\omega t})$$

here, $X_j$ is the complex amplitude of each motion (j=1 for sway, j=2 for heave, j=3 for roll), and $\omega$ is the angular frequency of the incident wave and $i = \sqrt{-1}$.

In terms of the aforesaid movements of the float, the radiated wave $\eta_j^\pm(x,t)$ is given by $$X \to \pm \infty \, \eta_j^\pm(x,t) = Re[iKH_j^\pm X_j e^{i(\omega t \mp Kx)}] \quad (1)$$

here,
j = 1, 2, 3,
K is the wave number $\omega^2/g$, and
$H_j^\pm$ is the Kochin Transform of velocity potential,
$Re(\phi_j e^{i\omega t})$ representing the field of flow of each movement, which Kochin transform is given by $$H_j^\pm = \int_c \left( \frac{\partial}{\partial n} \phi_j - \phi_j \frac{\partial}{\partial n} \right) e^{-Ky \pm iKx} ds \quad (2)$$

here, c represents the surface of the float, S; float surface, n; normal to the fluid perpendicular to the float surface.

The scattered wave $\eta_4^\pm(x,t)$ in response to the incident wave with a unit amplitude $\eta_0(x,t) = Re(e^{i(\omega t + Kx)})$ is given by $$X \to \pm \infty \, \eta_4^\pm(x,t) = Re[iKH_4^\pm e^{i(\omega t \mp Kx)}] \quad (3)$$

wherein $H_4$ is $$H_4^\pm = H_{2s} + /\bar{H}_2 + \pm H_{1s} + /\bar{H}_1 + \quad (4)$$

$$\begin{bmatrix} C_1(D_1 + i\phi H_{11}) - il_2\phi H_{12} + (D_{13} + i\phi H_{13}) & 2(D_1 + i\phi H_{11}) & -i2l_1\phi H_{12} \\ -iC_1\phi H_{12} + l_2(D_2 + i\phi H_{22}) - i\phi H_{23} - i\dfrac{\mu_0}{l_1} & -i2\phi H_{12} & 2l_1(D_2 + i\phi H_{22}) + i2\dfrac{\mu_0}{l_1} \\ C_1(D_{13} + i\phi H_{13}) - il_2\phi H_{23} + (D_3 + i\phi H_{33}) & 2(D_{13} + i\phi H_{13}) & -i2l_1\phi H_{23} \\ + i\dfrac{l_1 + l_2}{l_1}\mu_0 & & -i2\dfrac{l_1 + l_2}{l_1}\mu_0 \end{bmatrix} \times \qquad (8)$$

$$\begin{bmatrix} X_3^R + X_3^L \\ X_1^0 \\ X_3^0 \end{bmatrix} = -\dfrac{e^{iKl/2}}{K}\begin{bmatrix} H_1^+(1 - b\phi) \\ H_2^+(1 + b\phi) \\ H_3^+(1 - b\phi) \end{bmatrix}$$

$$\begin{bmatrix} C_1{}^2(D_1 + i\phi H_{11}) + 2C_1(D_{13} + i\phi H_{13}) + (D_3 + i\phi H_{33}) & -i2C_1\phi H_{12} - i2\phi H_{23} \\ -iC_1l_2\phi H_{12} - il_2\phi H_{23} + i\mu_0 & \\ l_2(D_2 + i\phi H_{22}) - iC_1\phi H_{12} - i\phi H_{23} & 2(D_2 + i\phi H_{22}) \end{bmatrix} \times$$

$$\begin{bmatrix} X_3^R - X_3^L \\ X_2^0 \end{bmatrix} = -\dfrac{e^{iKl/2}}{K}\begin{bmatrix} (C_1H_1^+ + H_3^+)(1 - b\phi) \\ H_2^+(1 + b\phi) \end{bmatrix}$$

$$H_{js}^+ = \int_c \left( \dfrac{\partial}{\partial n}\phi_{js} - \phi_{js}\dfrac{\partial}{\partial n} \right) e^{-Ky + iKx} ds$$

here, $\phi_{js}$ represents the imaginary part of $\phi_j$ and the bar (—) at the top portion of $\overline{H_j^+}$ represents the conjugate complex number of $H_j^+$.

When the incident wave comes from the right as seen in FIG. 5 and becomes incident to the two floats R and L, each of the two floats generates reflected waves and transmitted waves, and the wave thus generated interfere with each other in the space between the two floats. If the distance l between the two floats is long enough as compared with the distance which is subjected to the influence of the local wave produced by the movement of the float, such waves can be determined by considering the travelling wave components only.

In consequence, the incident wave to the float R is given by $$e^{iKl/2}e^{i(\omega t + K_xR)} + \qquad (6)$$

$$\left\{ \dfrac{ab}{1 - \alpha} e^{-i3Kl/2} + iK \sum_{K=1}^{3} H_K^- X_K^R \dfrac{a}{1 - \alpha} e^{-i2Kl} + iK \sum_{K=1}^{3} H_K^+ X_K^L \dfrac{1}{1 - \alpha} e^{-iKl} \right\} e^{i(\omega t - K_xR)}$$

The incident wave to the float L is given by $$\left\{ \dfrac{b}{1 - \alpha} e^{-iKl/2} + iK \sum_{K=1}^{3} H_K^- X_K^R \dfrac{1}{1 - \alpha} e^{-iKl} + iK \sum_{K=1}^{3} H_K^+ X_K^L \dfrac{a}{1 - \alpha} e^{-i2Kl} \right\} e^{i(\omega t + K_xL)} \qquad (7)$$

In the equations (6) and (7), $a = iH_4^+$, $b = 1 + iH_4^-$, $\alpha = a^2 e^{-i2Kl}$, and $X_j^R$ and $X_j^L$ are j mode complex amplitudes for the floats R and L. The following equation representing the motion of the 2-float system can be derived by considering the coercions by links, added mass forces, damping forces, static restoring forces, and resistive forces due to the damping means in response to the waves.

here,
$\mu_0 = \mu/(\Sigma\omega)$,
$p$ is the density of fluid,
$\mu$ is the coefficient of viscous damping,
$H_{ij} = H_i^+ H_j^+$,
$\phi = e^{-iKl}/(1 - ae^{-iKl})$, $\phi = -e^{-iKl}/(1 + ae^{-iKl})$,
$D_j = d_j + i|H_j^+|^2$,
$D_{13} = d_{13} + iH_1^+\overline{H_3^+}$,
$d_j$, $d_{13}$ consist of inertia force, added mass force, and static restoring forces,
$X_1^0$, $X_2^0$, $X_3^0$ are the complex amplitude of the middle point $O_0$ of the link.

Referring to FIG. 5, two viscous damping means 4 are disposed between the floats L, R and the link 2, so as to extract the wave energy by using the relative rotational speed differences among the two floats and the link. The average energy E being consumed per unit time by the viscous damper is given by $$E = \tfrac{1}{2}\mu\omega^2\{|X_3^R - X_3^0|^2 + |X_3^L - X_3^0|^2\} \qquad (9)$$

here, $\mu$ is the coefficient of viscous damping.

The equations (8) and (9) enable determination of the energy absorbing efficiency based on the average input energy $E_{in}$ transmitted by the unit-amplitude incident wave per unit width thereof in a unit time, i.e., $E_{in} = (\rho g^2)/(4\omega)$. The curve (1) of FIG. 6 shows the result of calculation of the energy absorbing efficiency by using the Lewis form which is used in naval architecture under the assumptions of half width/depth ratio $H_0B/(2D) = 0.5$, and
section modulus $\sigma = S_O/(BD) = 0.95$, here,
B is the width of the float,
D is the draft of the float, and
$S_O$ is the cross-sectional area of the float under the draft.

Figure 6:
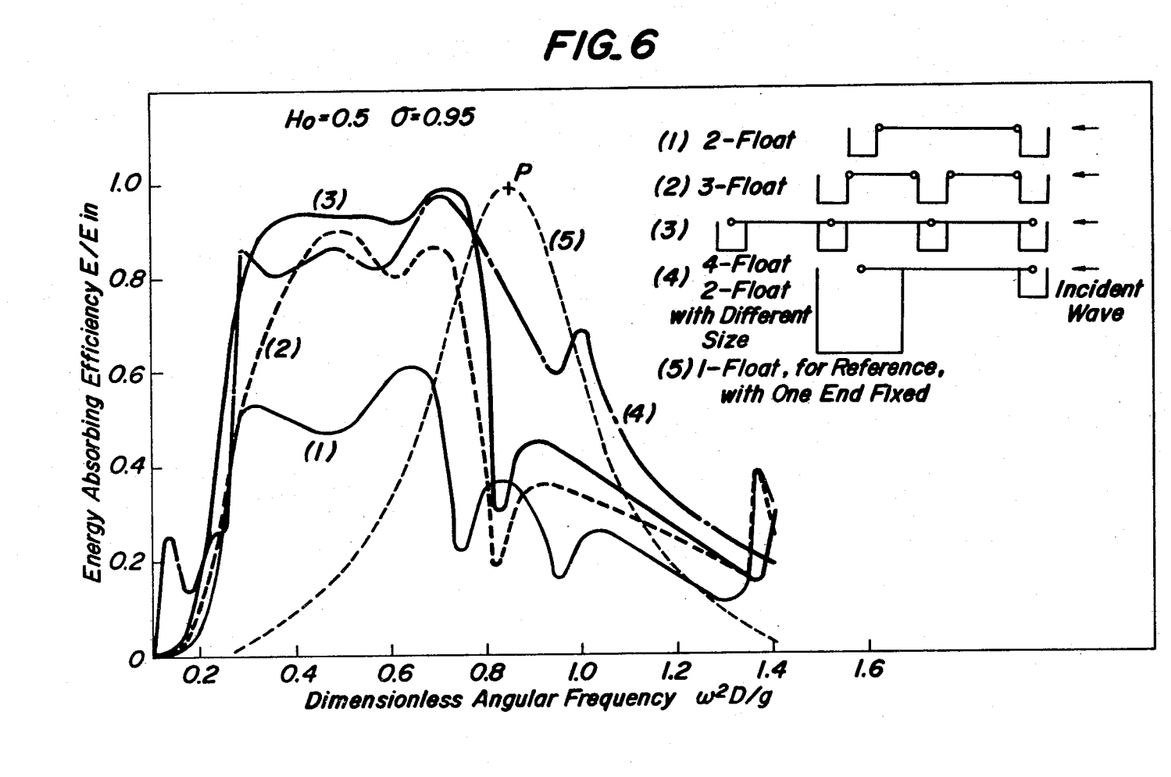
FIG. 6 is a graph showing the energy absorbing efficiency of the wave energy converter of the invention, as compared with that of the prior art.

In FIG. 6, $C_1'$, $l_2'$, $l'$, $\mu_0'$ are dimensionless values obtained by dividing the quantities $C_1$, $l_2$, $l$ (FIG. 5), and $\mu_0$ by B. In calculating the curves of FIG. 6, the values of $l'$ and $\mu_0'$ were selected so as to obtain maximum efficiency at the prescribed dimensionless angular frequency $\omega^2 D/g$ by a computer.

The curve (1) of FIG. 6 shows that the maximum energy absorbing efficiency is about 0.6.

The effect of the increased number of floats on the energy absorbing efficiency was studied. Relative movements the three floats and the two links were considered while assuming that the float shape and the selection of the coefficient of viscous damping and the distance between the floats was the same as those of the previous 2-float system. When the three floats which have the same configuration and are located at equal spaces are designated by symbols R, O, and L, and the complex amplitudes of the rollings of the floats R, O, L and two links are designated by $X_3^R$, $X_3^O$, $X_3^L$, $X_4^R$, and $X_4^L$, the wave energy E absorbed by four damping means (see FIG. 2C) is given by $$E = \tfrac{1}{2}\mu\omega^2 \{|X_3^R - X_4^R|^2 + |X_3^L - X_4^L|^2 + |X_3^O - X_4^R|^2 + |X_3^O - X_4^L|^2\} \quad (10)$$

Each of the aforesaid complex amplitudes for the 3-float system can be determined by equations of motion in a manner similar to that used for the 2-float system.

The curve (2) of FIG. 6 shows the energy absorbing efficiency of the 3-float system using the floats whose shapes are the same as those of the 2-float system of the curve (1) of the figure. In the curve (2), the maximum energy absorbing efficiency is higher than 0.9 and the frequency band giving a high energy absorbing efficiency is wider than that of the curve (1). Similarly, the energy absorbing efficiency of another wave energy converter of a 4-float system including four floats connected by three links was calculated. The curve (3) of FIG. 6 shows the result of the calculation.

Although the detailed derivation of the formulae to determine the wave energy absorbing efficiency of the 4-float system is not described here. The curve (3) shows that the maximum energy absorbing efficiency is close to 0.99, which means that almost all of the incident wave energy is extracted by the converter.

Floats with different configurations are also used in this invention, in which case more desirable characteristics are derived. Curve (4) in FIG. 6 shows this. When the incident wave proceeds from the right to the left, the total reflected wave $Re^{i(\omega t - Kx)}$ travelling rightward and the total transmitted wave $Te^{i(\omega t + Kx)}$ travelling leftward satisfy the following equation (11) if the wave energy is not extracted and the following equation (12) if wave energy is extracted.

$$|R|^2 + |T|^2 = 1 \quad (11)$$

$$|R|^2 + |T|^2 + (E/E_{in}) = 1 \quad (12)$$

here,

R is the amplitude of the total reflected wave and

T is the amplitude of the total transmitted wave.

Figure 7:
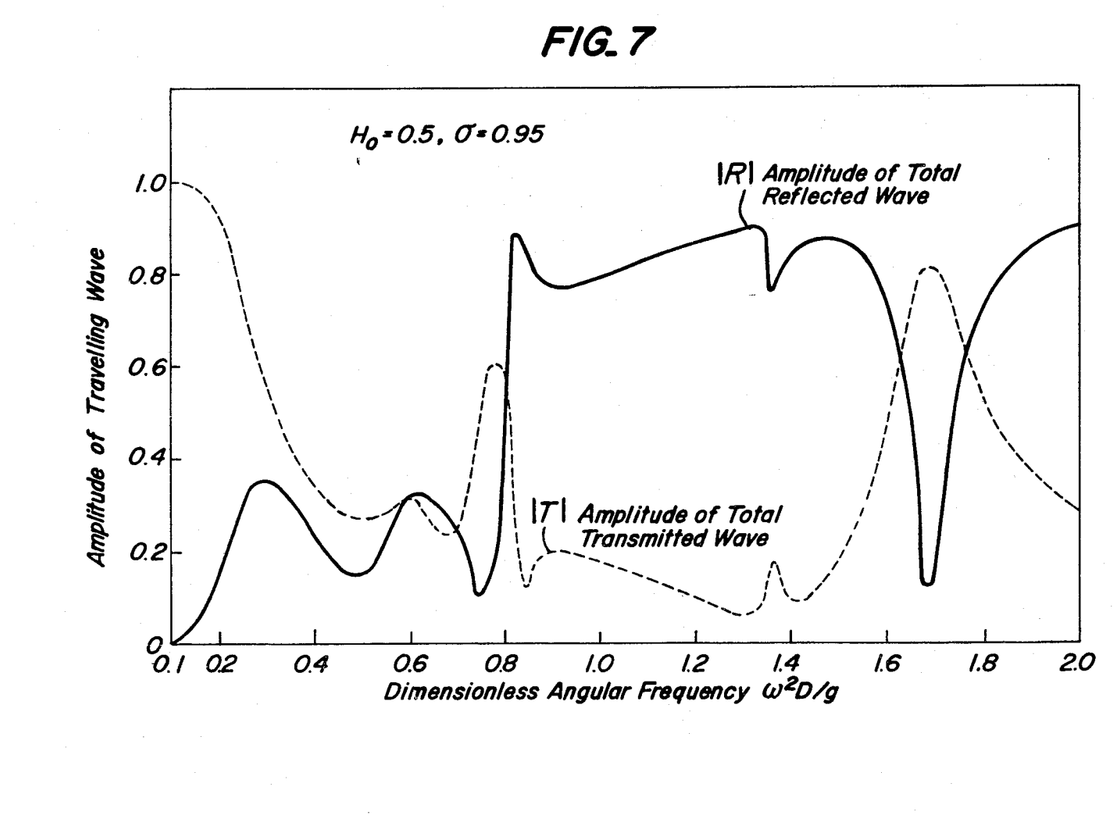
FIG. 7 is a graph showing the total reflected wave amplitude and the total transmitted wave amplitude of the wave energy converter of the invention.

FIG. 7 shows variations of the amplitude of the total reflected wave and the total transmitted wave for curve (2) of FIG. 6 for different frequencies of the incident wave, which variations indicate the manner in which the wave energy is effectively absorbed by the converter of the present invention.

Referring to FIG. 7 and using this system, the amplitude of the transmitted wave behind the float group of the converter becomes very small. Thus, the converter of the invention has a high wave suppressing effect over a wide range of wave frequencies.

As described in the foregoing, the wave energy converter of the present invention has a high energy conversion efficiency, and preferred embodiments thereof having two, three or four floats connected by links can convert more than 90% of the energy in the incident wave to mechanical energy in a wide range of frequencies by selecting appropriate system parameters. Besides, the energy conversion efficiency of the converter of the invention is practically unaffected by normally expected changes in the nature of the incident wave due to variation of the meteorological conditions, so that a high energy absorbing efficiency can be maintained regardless of weather conditions. Furthermore, the wave energy converter of the invention suppresses waves to a great extent and has a high strength against tidal ebb and flow, variations of wave height, and typhoons.

A practical example of the wave energy converter of the invention will now be considered.

For instance, each of the floats in the converter of the invention may have a width of 5 m, a draft of 5 m, and a cross-sectional area of 23.8 m². In the sea surrounding Japan, the average energy carried by wave of a wave height H and a wave period T is given by $H^2T/2.3$ kW/m, so that in the sea where the wave height is B 2 m and wave period is 6 sec., the average wave energy is 10 kW/m.

When a wave energy converter of the invention is formed by using two, three or four of the aforesaid floats connected by links so as to extend over a span of about 100 m, if the energy absorbing efficiency of the converter is 90% as explained above, about 900 kW of mechanical power can be extracted from the wave. For example, when 50 sets of such wave energy converters are disposed on the sea, about 45,000 kW of mechanical power can be extracted from the wave energy.

The wave energy converter of the invention is more suitable for producing a large number of units, each unit having a medium rating such as several hundred kW suitable for ensuring a high mechanical efficiency, rather than for producing one unit of very large scale, and such converters of medium ratings can be disposed in the vicinity of ports and coasts not only for energy extraction but also for wave suppression. Besides, the wave energy converter of the invention is particularly suitable for installation at isolated islands to generate electric power while suppressing waves. Thus, the converter of the invention is very useful.

If the wave energy converter of the invention is fixed to a pier or sea bed, the movement of the floats is restricted and its energy absorbing efficiency is greatly reduced, for instance to 10 to 20% of that of non-fixed installations. Nevertheless, it is desirable to moor the converter by a long rope or chain in a manner similar to the mooring of a ship. In mooring the wave energy converter of the invention, due care should be taken so as to ensure sufficient length of the mooring rope or chain for allowing free heaving, swaying, and rolling of the floats, and to ensure sufficient clearance from fixed structures of the piers and breakwaters for preventing the wave energy converter from colliding against such fixed structures. The length of the mooring rope or chain for the wave energy converter must be determined by considering the foreseeable highest waves and typhoons, so that the floats can stay afloat even when such converter is exposed to very high waves. In view of the severe conditions of the open sea, the floats are preferably hermetically sealed, so that the floats are prevented from sinking in high waves during a typhoon, because the sinking may leads to breakdown of the floats. If accessories such as the air turbines and electric generators are disposed in the floats and the electric power from the electric generators is transmitted ashore by submarine cables through the mooring points, the wave energy is converted into electric energy offshore and the electric energy thus obtained can be used on the land.

For reference, the curve (5) of FIG. 6 shows the energy absorbing efficiency of a 1-float type wave energy converter with one end of the float fixed for instance to a pier or a breakwater, which converter has a dynamic system including a mass means, a restoring means, and a damping means. The maximum efficiency of the curve (5) is restricted to a point P, and the energy absorbing efficiency is rapidly reduced as the frequency of the incident wave deviates from the point P, so that it is very difficult to efficiently extract the wave energy by using a 1-float system with one end of the float being fixed. Besides, the float with one end thereof fixed or restricted is susceptible to breakdown by high waves of typhoon or the like. Thus, the 1-float type wave energy converter is not practicable.

On the other hand, the wave energy converter of the present invention is featured in that the converter does not have any part thereof directly fixed or restricted.

Salient features of the wave energy converter of the invention can be summarized as follows.

(1) The energy absorbing efficiency is high and the frequency range of the incident wave to provide a high energy absorbing efficiency is very wide as compared with that of the prior art, provided that the natural frequency of the converter including the floats is approximately tuned to the frequency of the incident wave, as illustrated by the comparison of the curves (1) through (4) of FIG. 6 for the present invention and the curve (5) thereof for the prior art based on numerical calculations by using theoretically derived equations.

(2) The energy absorbing efficiency can be improved up to almost 100% and the frequency band for ensuring a high constant level of energy absorbing efficiency can be widened by increasing the number of floats or by using floats with different size. Two or three floats per energy converter appear to be economical.

(3) Considerable wave suppressing effect can be achieved at the back of the float group by using this system.

Although the invention has been described with a certain degree of particularity, it is understood that the present disclosure has been made only by way of example and that numerous changes in details of construction and the combination and arrangement of parts may be resorted to without departing from the scope of invention as hereinafter claimed.

What is claimed is:

1. A wave energy converter for extracting energy from a body of water subject to wave activity, comprising at least two floats floating in said water, said floats being free of the coastal ground and sea bed and allowed to heave, surge and roll, said floats being disposed at a right angle to the direction of incidence of waves in said body of water;

linkage means including a plurality of links, each of said links having one end pivotally coupled to one of said floats and the other end pivotally coupled to an adjacent float, a float and associated link comprising a float group; and restoring and damping means coupled between each of said floats and said linkage means, said floats, linkage means, restoring means and damping means forming a dynamic system for the extraction of wave energy from the movements of said floats relative to said linkage means, said dynamic system having a natural frequency tuned approximately to the frequency of said incident waves, whereby reflected and transmitted waves caused by said floats are substantially suppressed because of the extraction of energy from said incident waves.

2. A wave energy converter as set forth in claim 1, wherein said dynamic system includes an air chamber; and wherein said converter further comprises an air accumulator connected to said air chamber, said air accumulator being provided with flow rate control valves; an air turbine connected to said air accumulator through said flow rate control valves; and an electric generator coupled to said air turbine, said air accumulator receiving air from said air chamber and delivering air to said air turbine.

3. A wave energy converter as set forth in claim 2, wherein said air accumulator includes a relief valve for releasing pressure in excess of a preset limit from said air accumulator to the outside thereof.

4. A wave energy converter as set forth in claim 2, wherein said links are pivotally connected to said floats in the proximity of the centers of rotation thereof.

5. A wave energy converter as set forth in claim 1, wherein said dynamic system comprises a cylinder secured to said float group; a piston reciprocating in the cylinder in response to said movements between said floats and said links and between the adjacent links; a crank coupled to said piston so as to produce one-direction rotation from the reciprocation of said piston; and an electric generator coupled to said crank.

6. A wave energy converter for extracting energy from a body of water subject to wave activity, comprising at least two floats floating in said water, said floats being free of the coastal ground and sea bed and allowed to heave, surge and roll, said floats being disposed at a right angle to the direction of incidence of waves in said body of water;

linkage means including a plurality of links, each of said links having one end pivotally coupled to one of said floats and the other end pivotably coupled to an adjacent float, a float and associated link comprising a float group; and restoring and damping means coupled between each of said floats and said linkage means, said floats, linkage means, restoring means and damping means forming a dynamic system for the extraction of wave energy from the movements of said floats relative to said linkage means, said dynamic system having a natural frequency tuned approximately to the frequency of said incident waves, wherein said dynamic system comprises an air chamber secured to said float group;

a rotary blade adapted to turn about a central axis of said air chamber, said rotary blade dividing the inside of said air chamber into two portions, said air chamber having two intake ports facing said two air chamber portions and two discharge passages having end openings facing said two air chamber portions;

intake valve means selectively connecting said intake ports to said two air chamber portions;

discharge valve means selectively connecting said discharge passages to said two air chamber portions;

an air accumulator connected to said two discharge passages, said air accumulator having a relief valve and a flow rate control valve;

an air turbine receiving air from said flow rate control valve of said air accumulator; and an electric generator coupled to said air turbine so as to to generate electric power in response to rotation of said air turbine, whereby reflected and transmitted waves caused by said floats are substantially suppressed because of the extraction of energy from said incident waves.

7. A wave energy converter as set forth in claim 6, wherein said air chamber is secured to one of said floats and said links, and said rotary blade is coupled to that portion of said float group which moves relative to said air chamber, said rotatry blade rotating in response to incident wave so as to compress air from said intake ports and force the compressed air toward said air turbine through said discharge port.

8. A wave connector as set forth in claim 1, wherein two floats are provided, and wherein the configuration of one of said floats is different from the other.

* * * * *